US008156362B2

(12) United States Patent
Branover et al.

(10) Patent No.: US 8,156,362 B2
(45) Date of Patent: Apr. 10, 2012

(54) HARDWARE MONITORING AND DECISION MAKING FOR TRANSITIONING IN AND OUT OF LOW-POWER STATE

(75) Inventors: Alexander Branover, Chestnut Hill, MA (US); Frank Helms, Austin, TX (US); Maurice Steinman, Marlborough, MA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 896 days.

(21) Appl. No.: 12/198,974

(22) Filed: Aug. 27, 2008

(65) Prior Publication Data

US 2009/0235105 A1 Sep. 17, 2009

Related U.S. Application Data

(63) Continuation-in-part of application No. 12/045,764, filed on Mar. 11, 2008, now Pat. No. 8,028,185.

(51) Int. Cl.
*G06F 1/00* (2006.01)
(52) U.S. Cl. ........................................ 713/330; 710/262
(58) Field of Classification Search .......... 713/300–320, 713/323–330; 710/260, 262
See application file for complete search history.

(56) References Cited

U.S. PATENT DOCUMENTS

| 5,740,417 | A | 4/1998 | Kennedy et al. |
| 6,510,525 | B1 | 1/2003 | Nookala et al. |
| 6,553,501 | B1 | 4/2003 | Yokoe |
| 6,954,864 | B2 | 10/2005 | Schelling |
| 6,988,214 | B1 | 1/2006 | Verdun |
| 7,152,169 | B2 | 12/2006 | Cooper et al. |
| 7,159,766 | B2 | 1/2007 | Wurzburg et al. |
| 7,200,762 | B2 | 4/2007 | Pearl |
| 7,613,934 | B2 | 11/2009 | Hou et al. |
| 2009/0150696 | A1 | 6/2009 | Song et al. |
| 2009/0164814 | A1 | 6/2009 | Axford et al. |

OTHER PUBLICATIONS

"Advanced Configuration and Power Interface Specification"; Hewlett-Packard Corporation, Intel Corporation, Microsoft Corporation, Phoenix Technologies Ltd., Toshiba Corporation; Oct. 10, 2006; 631 pages.

*Primary Examiner* — Clifford Knoll
(74) *Attorney, Agent, or Firm* — Meyertons Hood Kivlin Kowert & Goetzel, P.C.; Jeffery C. Hood

(57) ABSTRACT

A power management controller (PMC) that interfaces with a processor comprising one or more cores. The PMC may be configured to communicate with each respective core, such that microcode executed by the respective processor core may recognize when a request is made to transition the respective core to a target power-state. For each respective core, the state monitor may monitor active-state residency, non-active-state residency, Direct Memory Access (DMA) transfer activity associated with the respective core, Input/Output (I/O) processes associated with the respective core, and the value of a timer-tick (TT) interval associated with the respective core. The status monitor may derive respective status information for the respective core based on the monitoring and indicate whether the respective core should be allowed to transition to the corresponding target power-state. The PMC may transition the respective processor core to the corresponding target power-state accordingly.

33 Claims, 7 Drawing Sheets

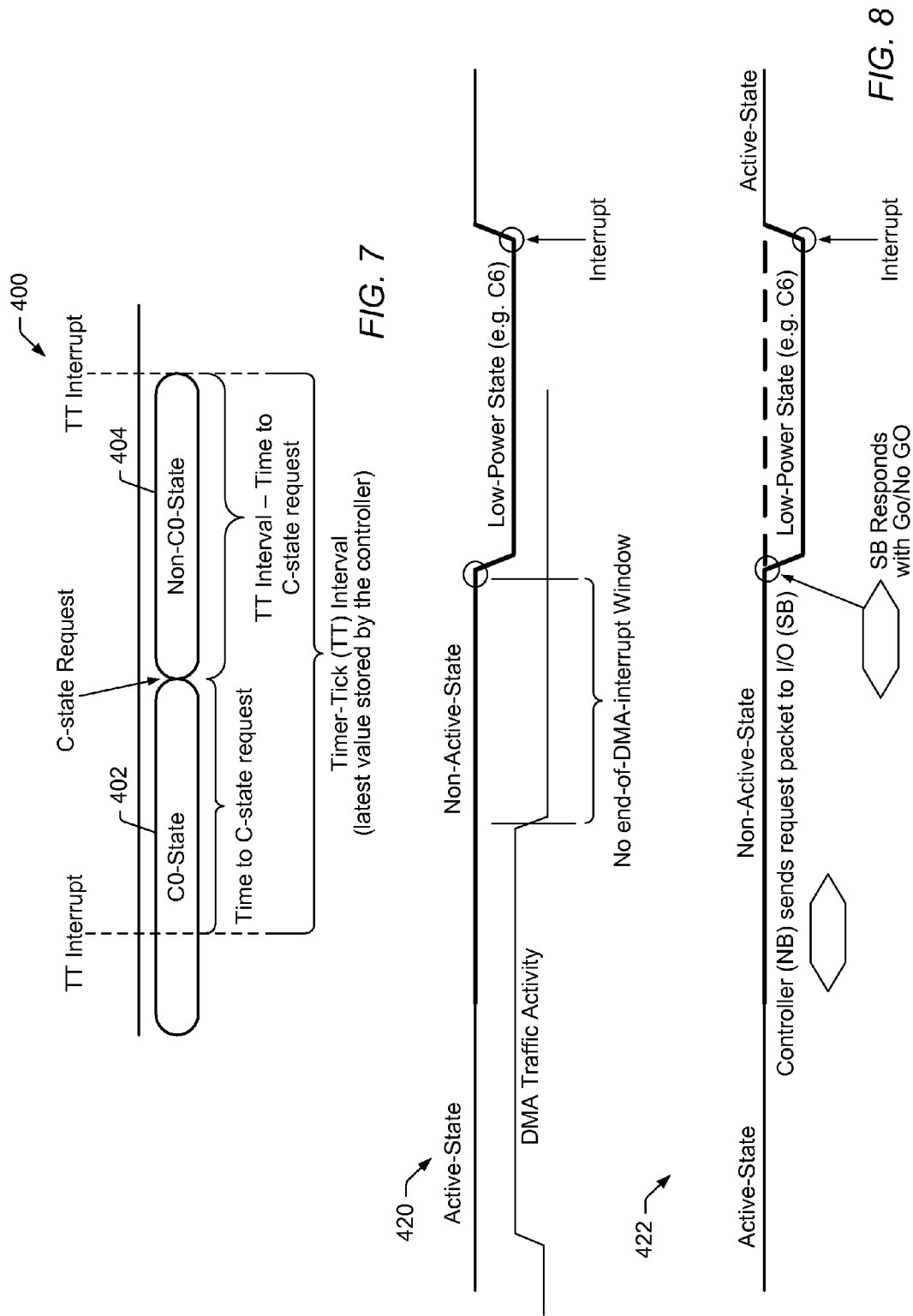

's transitioning in and out of the C6-state can therefore

HARDWARE MONITORING AND DECISION MAKING FOR TRANSITIONING IN AND OUT OF LOW-POWER STATE

PRIORITY CLAIM

This application is a continuation-in-part of U.S. utility application Ser. No. 12/045,764 titled "A Protocol for Transitioning In and Out of Zero-Power State" filed Mar. 11, 2008 now U.S. Pat. No. 8,028,185, whose inventors were Alexander Branover, and Rajen S. Ramchandani, and which is hereby incorporated by reference in its entirety as though fully and completely set forth herein.

BACKGROUND OF THE INVENTION

1. Field of the Invention

This invention relates generally to the field of computer design and, more particularly, to the design of a monitoring and decision making protocol for transitioning processing units in and out of a target power-state, such as low-power state.

2. Description of the Related Art

The ever increasing advances in silicon process technology and reduction of transistor geometry makes static power (leakage) a more significant contributor in the power budget of processors (CPUs). Currently known CPU ACPI (Advanced Configuration and Power Interface) and ACPI-based low-power states (CI-C5) are very instrumental in eliminating dynamic power consumption and reducing the CPU static power. The ACPI is an open industry standard originally developed by Hewlett-Packard, Intel, Microsoft, Phoenix, and Toshiba, and defines common interfaces for hardware recognition, motherboard and device configuration and power management. The most widely recognized element of ACPI is power management, offering improvements over past power management methods by giving the Operating System (OS) control of power management, in contrast with prior power management models where power management control was mainly under the control of the BIOS, with limited intervention from the OS. In ACPI, the BIOS provides the OS with methods for directly controlling the low-level details of the hardware, providing the OS with nearly complete control over the power savings.

Another important feature of ACPI is bringing power management features previously only available in portable computers to desktop computers and servers. For example, systems may be put into extremely low consumption states, i.e., states in which only memory, or not even memory, is powered, but from which "general-purpose events" (GPEs, similar to interrupts, which can be sent by devices such as the real-time clock, keyboard, modem, etc.) can quickly wake the system. ACPI uses its own ACPI Machine Language (or AML) for implementing power event handlers, rather than the native assembly language of the host system, and while the AML code is typically part of firmware (BIOS) it is interpreted by the OS.

The ACPI specifies various groups of states, among them global states, device states, performance states, and processor states. For example, the ACPI standard defines four processor power states, C0-C3. C0 is the operating state. C1 (often referred to as Halt state) is a state in which the processor is not executing instructions, but can (essentially) instantaneously return to an executing state. Some processors also support an Enhanced C1 state (C1E) for lower power consumption. C2 (often known as Stop-Clock state) is a state in which the processor maintains all software-visible states at the expense of possibly taking longer to wake up. C3 (often known as Sleep state) is a state in which the processor does not need to keep its cache coherent, but does maintain other states. Some processors have variations on the C3 state (Deep Sleep, Deeper Sleep, etc.) that differ in how long it takes the processor to wake up. While the ACPI specifies 4 states (C0-C3), processors can have independently defined hardware states that range from C0 to C5 and beyond, as previously mentioned. A processor generally supports each of those C-states, which are typically mapped to a particular ACPI C-state depending on the behavior of the processor while in that state, as defined by ACPI. However, none of these states completely eliminates the static power component consumed by the processor. Therefore the efficiency of C1-C5 states for power saving is becoming more limited for advanced CPU manufacturing process technologies and smaller transistor geometries.

Various methods have been proposed and implemented to lower power consumption as much as possible. For example, power consumption may be lowered by sizing-down, invalidating, and eventually turning-off the L2 cache by lowering the retention voltage to a level lower than is needed to retain L2 contents. This is also known as the C5-state. While this offers one possible solution in eliminating the massive L2 component from the static power consumption budget, it does not eliminate the power consumption contribution of smaller arrays (e.g. L1 cache) or regular logic, thus maintaining static power at fairly high level for advanced (45 nm and lower) processes.

A new state, the C6 state, first introduced by Intel in 2007, allows for complete elimination of both dynamic and static components of power consumption, by transitioning the CPU to the zero-state where 0V is applied to the CPU voltage plane, and the CPU clock is completely turned off. It should be noted that the C6-state is not equivalent to system sleep state S3 where most of the system is powered down, and restoration to the C0-state requires an extended period of time, oftentimes in the range of many seconds. The C6-state can be applied to a single-core processor or to any core or group of cores in multi-core processors, while keeping other cores and system components (chipset, I/O, DRAM) in fully functional state. At the moment the OS indicates the need for allocating some task/process on a given CPU that is presently in the C6-state, that given CPU is powered-up and becomes available for executing the requested task/process. Generally, the C6-state provides enablement for a more aggressive performance-oriented approach to CPU process technology (for example reducing the transistor effective length), which would otherwise be impeded by the inevitable increase in static power consumption. Effectively managing a processor's transitioning in and out of the C6-state can therefore lead to improved power management and result in reduced overall power consumption.

Other corresponding issues related to the prior art will become apparent to one skilled in the art after comparing such prior art with the present invention as described herein.

SUMMARY OF THE INVENTION

In one set of embodiments, a method for transitioning a processing unit to a target power-state may include monitoring active-state residency of the processing unit, non-active-state residency of the processing unit, Direct Memory Access (DMA) transfer activity associated with the processing unit, Input/Output (I/O) processes associated with the processing unit, and the value of a timer-tick (TT) interval associated with the processing unit. The method may further comprise deriving status information from the monitoring, and determining based on the status information whether to allow the processing unit to transition to the target power-state, for example a low-power state or a zero-volt (C6) state. When a request for transitioning the processing unit to the target power-state is received, the request may be granted in response to the status information indicating that the processing unit should be allowed to transition to the target power-state, and denied in response to the status information indicating that the processing unit should not be allowed to transition to the target power-state.

In one set of embodiments, the status information may comprise a first value indicative of how frequently the processing unit resides in an active-state for less than a first time interval, a second value indicative of how frequently the processing unit resides in a non-active-state for more than or equal to a second time interval, a third value indicative of expected interrupts corresponding to the DMA transfer activity, a fourth value indicative of expected interrupts corresponding to the I/O processes, and a fifth value indicative of a time interval remaining before a next TT interrupt. Monitoring the active-state residency of the processing unit may include incrementing a count value each time the processing unit remains in an active-state for less than a specific time interval, and decrementing the count value each time the processing unit does not remain in the active-state for less than the specific time interval, checking the count value, and indicating that the processing unit is allowed to transition to the target power-state when the count value equals a specific value. In one embodiment, the count value is no longer be incremented once it reaches the specific value, and/or it is no longer decremented once it reaches a specified minimum, which may be zero. The default value of the count value may be zero.

Monitoring the non-active-state residency of the processing unit may comprise incrementing a count value each time the processing unit remains in a non-active-state for longer than or equal to a specific time interval, and decrementing the count value each time the processing unit does not remain in the non-active-state for longer than or equal to the specific time interval, checking the count value, and indicating that the processing unit is allowed to transition to the target power-state when the count value is greater than or equal to a first value. In certain embodiments, the count value may no longer be incremented once it reaches the first value, in other embodiments it may no longer be incremented once it reaches a second value greater than the first value. The count value may no longer be decremented once it reaches a specified minimum, which may be zero. The default value of the count value may be set to zero.

In one set of embodiments, monitoring the DMA transfer activity associated with the processing unit may include waiting for an end-of-DMA interrupt for a specific time period from the end of a monitored DMA transfer, and determining whether the end-of-DMA interrupt occurs during the specific time period, and indicating that the processing unit is allowed to transition to the target power-state once the specific time period expires, if the end-of-DMA interrupt does not occur during the specific time period. Monitoring the I/O processes associated with the processing unit may comprise receiving I/O information from a hub comprising and/or interfacing with a plurality of I/O devices, determining whether or not the I/O information is indicative of one or more interrupts expected based on I/O activity, and indicating that the processing unit is allowed to transition to the target power-state, in response to an indication that no interrupts based on I/O activity are expected.

In one set of embodiments, monitoring the value of a timer-tick (TT) interval associated with the processing unit may include tracking subsequent TT interrupts and determining a time elapsed between the subsequent TT interrupts to obtain a current value of the TT interval, and/or tracking operating system updates of the TT interval and storing a latest value of the TT interval. The length of a first time period may be determined, with the length of the first time period indicating how long the processing unit would reside in the target power-state until a next TT interrupt occurred. Determining the length of the first time period may comprise determining the length of a second time period, with the length of the second time period indicating the time elapsed between a most recently occurred previous TT interrupt and receipt of a request for the processing unit to transition to the target power-state, and obtaining an expected time period by subtracting the length of the second time period from the current value of the TT interval, or by subtracting the length of the second time period from the latest value of the TT interval. The processing unit may be allowed to transition to the target power-state when the expected time period is greater than a specified power saving threshold time period.

The processing unit may comprise one or more processor cores comprised in a multi-core processor, it may comprise one or more embedded microcontrollers, one or more embedded processors, and/or one or more digital signal processors. The target power-state may be, among others, a low-power state, a zero-volt state, or a non-active state. Alternate embodiments may include other states. Those skilled in the art will appreciate that the methods and protocols disclosed herein may be adapted to any number of preferred target power-states and/or processing units, and that these methods and protocols are not limited to the target power-states and/or processing units or processing cores specifically disclosed in the discussed embodiments.

In one embodiment, a processor may comprise a processing core, and a controller interfacing with the processing core. The controller may be configured to monitor active-state residency of the processing core, non-active-state residency of the processing core, DMA transfer activity associated with the processing core, I/O processes associated with the processing core, and the value of a timer-tick (TT) interval associated with the processing core. The controller may also be configured to derive status information from the monitoring, and determine based on the status information whether to allow the processing core to transition to a target power-state. The controller may further be configured to receive a request to transition the processing core to the target power-state, grant the request in response to the status information indicating that the processing core should be allowed to transition to the target power-state, and deny the request in response the status information indicating that the processing core should not be allowed to transition to the target power-state.

The processor may further comprise one or more additional processing cores, with the controller further configured to monitor respective active-state residencies of one or more of the one or more additional processing cores, respective non-active-state residencies of one or more of the one or more additional processing cores, respective DMA transfer activities associated with one or more of the one or more additional processing cores, respective I/O processes associated with one or more of the one or more additional processing cores, and respective values of TT intervals associated with one or more of the one or more additional processing cores. For each respective core of one or more of the one or more additional processing cores for which the monitoring is performed, the controller may also be configured to derive respective status information based on the monitoring, and determine based on the respective status information whether the respective core should be allowed to transition to a corresponding target power-state, which may be a low-power state, a zero-volt state, or a non-active state, just to provide a few examples. In one set of embodiments, the controller may also be operated to receive a respective request for the respective core to transition to the corresponding target power-state, grant the respective request when the respective status information indicates that the respective core should be allowed to transition to the corresponding target power-state, and deny the respective request when the respective status information indicates that the respective core should not be allowed to transition to the corresponding target power-state.

In one embodiment, a system may comprise one or more processing units, and a control unit configured to monitor respective active-state residencies of one or more of the processing units, respective non-active-state residencies of one or more of the processing units, respective DMA transfer activities associated with one or more of the processing units, respective I/O processes associated with one or more of the processing units, and respective values of TT intervals associated with one or more of the processing units. For each respective processing unit of one or more of the processing units for which the monitoring is performed, the control unit may derive respective status information based on the monitoring, and determine based on the respective status information whether the respective processing unit should be allowed to transition to a corresponding target power-state. The control unit may also receive a respective request for the respective processing unit to transition to the corresponding target power-state, grant the respective request when the respective status information indicates that the respective processing unit should be allowed to transition to the corresponding target power-state, or deny the respective request when the respective status information indicates that the respective processing unit should not be allowed to transition to the corresponding target power-state.

In some embodiments, a processor may comprise one or more processor cores, each respective processor core of the one or more processor cores comprising one or more state registers, and non-volatile memory configured to store microcode instructions executed by the respective processor core. The processor may further include a power management controller interfacing with the non-volatile memory of each respective processor core of the one or more processor cores, and a state monitor interfacing with the power management controller. The power management controller may interface with the non-volatile memory of each respective processor core to provide action requests and receive action acknowledges from microcode that may reside in the non-volatile memory of the respective processor core, and which may be executed by the respective processor core. The power management controller may be configured to communicate with the non-volatile memory of each respective processor core of the one or more processor cores to recognize when a respective request is made to transition the respective processor core from an active state to a corresponding target power-state, which may be a low-power state, a zero-volt state, or a non-active state, just to name a few. It should also be noted that in many embodiments, low-power states and/or zero-volt states may all be considered non-active-states. The state monitor may monitor respective active-state residency of the respective processing core, respective non-active-state residency of the respective processing core, respective DMA transfer activity associated with the respective processing core, respective I/O processes associated with the respective processing core, and respective value of a TT interval associated with the respective processing core. The state monitor may also be configured to derive respective status information for the respective processing core based on the monitoring, and set a respective flag for the respective processing core based on the respective status information, wherein the respective flag is indicative of whether the respective processing core should be allowed to transition to the corresponding target power-state. The power management controller may then transition the respective processor core to the corresponding target power-state based at least on the respective flag.

In one set of embodiments, the processor may be comprised in a system, with the system further comprising a hub, which, in some embodiments, may be a South-Bridge, that includes and/or interfaces with a plurality of I/O devices operated to perform the I/O processes, with the hub configured to indicate to the state monitor whether or not an interrupt is expected based on I/O activity. The system may comprise one or more DMA modules operated to perform the DMA transfer activity, with the DMA transfer activity including transfers to and/or from system memory performed by the DMA modules.

Thus, by monitoring state residency and predicting various types of interrupts (e.g. TT interrupts, end-of-DMA interrupts, and/or I/O based interrupts), processing units, processors, and/or processor cores may be transitioned into various target power-states with more efficiency, achieving a more optimal balance between power savings and performance.

BRIEF DESCRIPTION OF THE DRAWINGS

Other aspects of the invention will become apparent upon reading the following detailed description and upon reference to the accompanying drawings in which:

FIG. 7 is a timing/state diagram of one embodiment of a protocol for predicting timer tick interrupts; and FIG. 8 is a timing/state diagram of one embodiment of a protocol for predicting I/O based and end-of-DMA interrupts.

Figure 1:
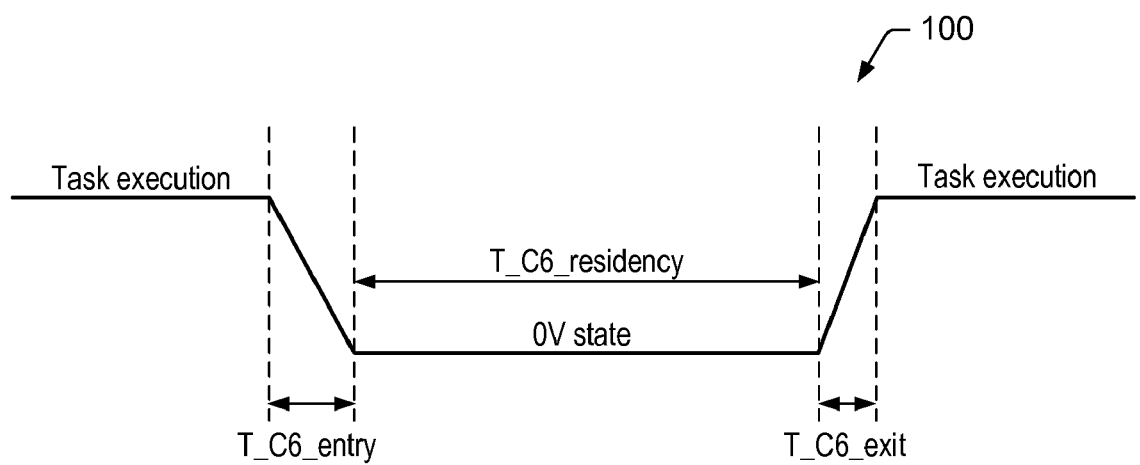
FIG. 1 shows a conceptual diagram of transitioning between an operating state and C6-state (0V-state), to illustrate C6-state residency trade-off between transition times and power.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

A zero-power or zero-volt (0V) state, otherwise referred to as C6-state may allow for complete elimination of both dynamic and static components of power consumption, by transitioning a processor core (or multiple processor cores) to a state in which the respective supply voltage of the processor core may be reduced to 0V, and the operating clock used by the processor core may be uncoupled from the processor core, or gated off from the processor core, meaning simply that the clock signal may be prevented from reaching the processor core. Alternately, the operating clock used by the processor may be completely turned off, e.g. when no other system components depend on the same clock. C6-state is not equivalent to system sleep, e.g. state S3 where most of the system is powered down, and restoration to the operating state (C0-state) may require an extended period of time, oftentimes many seconds. C6-state may be applied to a single-core processor or to any core or group of cores in multi-core processors, while keeping other cores and system components (e.g. chipset, I/O, DRAM) in a fully functional state. Similarly, C6-state may be applied to single-core microcontrollers or to any core or group of cores in multi-core microcontrollers, while keeping other cores and system components in a fully functional state. In general, transitioning in and out of C6-state as set forth and disclosed herein is not meant to be limited to processors and microcontrollers, and may equally be applicable to other similar circuits and/or processing units configured in various systems, for example digital signal processing units, graphics processing units, etc.

When the Operating System (OS) or a high-level program indicates the need for allocating certain tasks/processes to execute on a processor core that is currently in C6-state, the processor core may be powered-up and may become available for executing the requested tasks/processes. Generally, the C6-state may provide enablement for a more aggressive performance-oriented approach to processor fabrication process technology—for example, reducing the effective transistor channel-length—which would otherwise be impeded by the inevitable increase in static power consumption. In one set of embodiments, a protocol between microcode executing on a processor core configured within a processor, and a first circuit (or control circuit or controller, such as a North Bridge controller for example), also configured within the processor may be used for transitioning the processor core to C6-state. In general, the protocol may be used for effectively transitioning any one or more processor cores in and out of C6-state. By performing transition to low power states, e.g. to C6-state, without requiring any control signals from outside the processor, for example from a South Bridge, a more efficient and less complicated transition to a low-power state, or zero-power state may be achieved. In effect, a single chip processor, that is, a processor implemented as an integrated circuit (IC) may conduct transition of one or more of its cores to a low-power state based on an interrupt signal generated by circuitry on the processor die itself.

In one set of embodiments, either OS or HW-based inference logic tracking a processor's (CPU's) idle state may request the core (or any one or more of all the cores) of the processor to transition into C6 (0V) state. As used herein, C6-state refers to a zero-power state, which may itself refer to a zero-volt (0V) state. In certain embodiments, a zero-power state may be defined as a lowest-voltage state that is not exactly 0V, based on the particular requirements of any given system. Those skilled in the art will appreciate that zero-power state is not necessarily limited to 0V, and the protocol described herein may be used for transitioning to a zero-power state independently of the value of the actual voltage level associated with the zero-power level. In one set of embodiments, transitioning to C6-state may include the following steps:

(1) Storing (flushing) the updated contents of the processor caching system (e.g. L1, L2, L3, etc.) to the main (system) memory.

(2) Saving the architectural and system state in some powered-on storage.

(3) Turning down the processor clocking system.

(4) Reducing the supply voltage (powering the processor core) to 0V.

The architectural and system state may need to be saved in order to correctly and deterministically resume execution of the instruction stream when the processor core is transitioned back into the operational (C0) state. The architectural and system state may be saved either in external memory (e.g. system memory, DRAM) or in some on-die storage capacity that is not powered down in C6-state, and would therefore be configured outside of the processor core being placed in the C6-state. A processor core residing in C6-state may transition back to the operational state (C0) when one or more tasks need to be allocated to the processor core for execution. This may be requested via an interrupt signal or message. Transition from C6-state to C0-state may include the following steps:

(1) Restoring the supply voltage level of the processor core to operational level.

(2) Relocking the PLL.

(3) Resetting the processor core's internal state.

(4) Restoring the processor core's architectural and system state by reading the saved state from the external memory or on-die storage capacity where it was stored during transitioning to C6-state.

It should be noted that while one or more processor cores of a multi-core processor are in C6-state, other cores may remain in a fully operational state, executing tasks. If I/O devices send coherent probes while a processor core is in C6-state, the processor core's caching system may not need to be snooped, since its dirty (modified) contents would have been saved in main memory during the transition to C6-state.

One of the factors that may help achieve maximum power savings when placing a processor core (or multiple processor cores) is in C6-state is decreasing C6-state entry and exit times, while maximally lowering power consumption during those C6-state entry and exit times. Another key factor may be increasing C6-state residency. FIG. 1 provides a conceptual overview of the trade-off between transitioning into C6-state and C6-state residency. As shown in diagram 100, the overall time T (for C6-state entry, residency and exit) may be a sum of T_C6_entry+T_C6 residency+T_C6_exit. The overall power consumption P_C6 while in C6-state may then be calculated as $$P\_C6 = P\_\text{entry} * (T\_C6\_\text{entry}/T) + P\_\text{exit} * (T\_C6\_\text{exit}/T). \quad (1)$$

This implies that in order to keep P_C6 as close to 0 W as possible, the entry and exit times may need to be significantly lower than T_C6-residency. Another requirement may be to keep P_entry and P_exit lower than a specified threshold value. This may be implemented as a part of the C6-state entry/exit configuration, whereby the process of transitioning in and out of C6-state takes place in the operational state of the processor core characterized by the lowest power consumption. Additional requirements may include keeping the zero-power voltage configurable. As also previously indicated, the zero-power voltage may be defined higher than 0V (e.g. 0.2V~0.4V) trading off between low leakage and faster transition time (the higher the zero-power voltage, the shorter the transition time from operational state (C0) to C6-state.

Protocol Between Microcode and NB Controller

Figure 2:
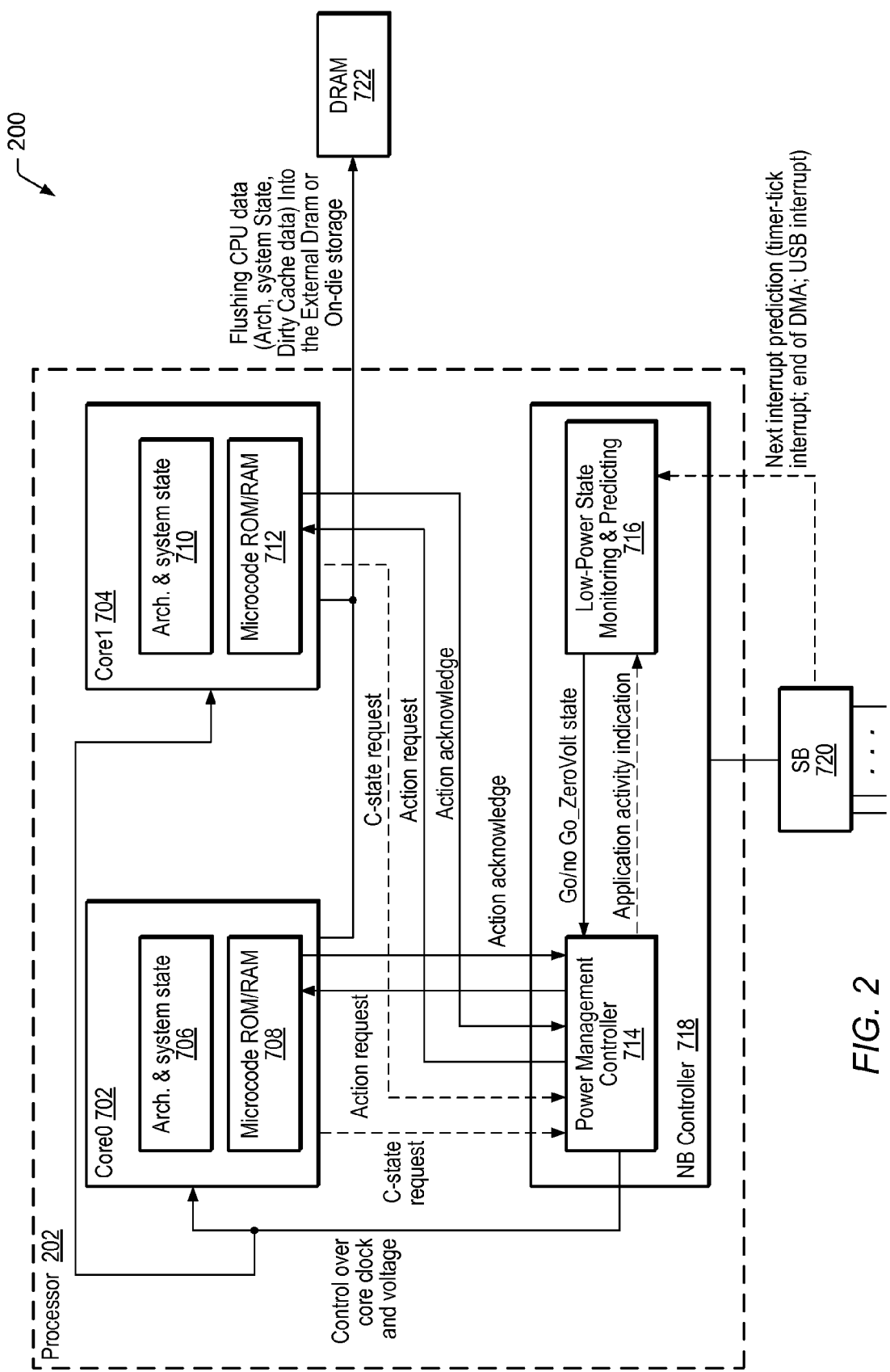
FIG. 2 is a partial logic block diagram of one embodiment of a computer system that includes a processor comprising one or more cores configured to transition between C-states.

FIG. 2 is a partial logic block diagram showing one embodiment of a computer system 200 that includes a processor 202 comprising one or more cores (702 and 704) configured to transition between power states, e.g. C-states using a protocol (which, in one set of embodiments, may be considered a "handshake" protocol) between a controller (718) configured on the processor, and microcode executing on the processor core (e.g., the processor core that is to transition to C6-state). Controller 718 may in general be a circuit (e.g. a "first circuit") configured on processor 202 to perform one or more functions in support of the one or more cores situated on the processor (cores 702 and 704 in the embodiment shown in FIG. 2). This circuit itself may comprise one or more circuits configured to perform one or more functions that may together comprise the full functionality of the circuit (which may also be referred to as a controller or control circuit). As shown in FIG. 2, this circuit is an NB controller (NBC) 718, which may include a circuit (or sub-circuit) configured to perform power management control as one of the functions of the overall functionality of NB controller 718. Furthermore, in yet other embodiments, the circuit (or controller or control circuit) represented in FIG. 2 by NB controller 718 may also be implemented as a distributed circuit, in which respective portions of the distributed circuit may be configured in one or more of the processor cores, but operating on separate power planes, that is, using a different power supply than the section or sections of the cores functionally distinct from the portion or portions of the distributed circuit. The separate power planes, or distinct/separate power supplies may thereby enable each respective portion of the distributed circuit to perform its functions even when the rest of the processor core, e.g. the respective main section or sections (e.g. general processing section or sections) of the processor core that are functionally distinct from the respective portion of the distributed circuit, is in a zero-power state. This enables embodiments that feature a distributed circuit, distributed controller or distributed control circuit performing at least some or all of the functions performed by NB controller 718 shown in FIG. 2.

In the embodiment of FIG. 2, a circuit performing at least a portion of the overall functionality of NB controller 718 is shown as a power management controller (PMC) 714, which may be configured to communicate with each core (702 and 704). More specifically, PMC 714 may be configured to handle C-state requests received from core 702 and/or core 704, and interface with non-volatile memory elements, in this case ROMs, 708 and 712, respectively, to provide action requests and receive action acknowledgement to/from the microcode executing on core 702 and/or 704. Cores 702 and 704 may also comprise internal registers 706 and 710, respectively, or some other form of storage medium to hold architecture and system information. NB controller 718 may also interface with South Bridge (SB) 720, and system memory (in this embodiment, DRAM) 722. PMC 714 may also provide control over the supply voltage and operating clock of each core, and may communicate with Low-Power state monitoring and predicting (LMP) block 716 to determine whether transitioning to a requested C-state is to be performed. For example, if PMC 714 has determined that a requested C-state transition corresponds to a request to transition to a C6-state (zero-power HW state), PMC 714 may determine whether or not to perform the transition based on information received from LMP block 716.

Monitoring Functions

In one set of embodiments, LMP block 716 may be configured to perform one or more monitoring functions and/or algorithms for determining whether or not transition to a requested low-power state, or zero-power state (0V state) should be made, once PMC 714 has determined that a requested C-state transition corresponds to a request to transition to a C6-state. In general, in addition to a C6-state, other states may possibly be designated as low-power states for which monitoring in LMP 716 may be performed. For example, in one set of embodiments C5-state and C6-state may be designated as deep C-states or low-power states for the purposes of such monitoring. In addition, alternate embodiments may implement such monitoring for all possible states (C-states) according to desired system performance and performance indicators, and the monitoring for determining whether transition to a requested target power-state should be allowed to occur may be performed for any of the available C-states, with a boundary (or "fall-through") state designated as a default, to which transitioning may always take place, even in cases when transition to all other states (C-states) may have been blocked.

Therefore, once it has been determined, for example by PMC 714, that the software/system has requested a transition to a low-power state, e.g. C6-state, controller 718 may prevent this transition from taking place, and in some cases may demote requested C-state transitions to corresponding transitions to another C-state. For example, a requested transition to a C6-state may be demoted to a transition to C5-state or C4-state. In a similar manner, controller 718—or more specifically, in the embodiment shown in FIG. 2, PMC 714 inside controller 718—may promote a transition to a given C-state requested by the system, to a transition to another C-state, based on the indication received from LMP 716 whether transition to a deep C-state or low-power-state should be allowed to take place. Thus, for example, a request to transition to C5-state may be promoted to a transition to C6-state. In one set of embodiments, LMP block 716 may be configured to track both history and recent state status for making a decision whether to allow a given transition to proceed as requested, indicate that the requested transition should be demoted to a transition to a higher performance (lower C) state, or indicate that the requested transition should be promoted to a transition to a lower performance (higher C) state, possibly a zero-power (C6) state.

In one set of embodiments, LMP 716 may be configured to perform a variety of specific tasks and/or execute/implement one or more algorithms to determine whether transition to a low-power state should proceed, and/or whether transition to a power state different than the requested power state might be preferable.

First Monitoring Function

A first monitoring function may include tracking recent history in the active (C0) state. If the latest residency in the active (C0) state exceeds some threshold (or specific time period), it may be an indication of recent high level of activity on the part of the affected CPU, or on the part of one or more corresponding cores of the CPU (whichever cores reside in the active state in question). This may be in contrast to the CPU—or the one or more cores of the CPU—running idle or executing shorter tasks, and transition to a low-power state, or deep C-state, may result in a loss of application performance due to a potentially long recovery time from exiting the given low-power state or deep C-state (which may be a C6-state).

In other words, the first monitoring function may be directed to determining how active a given application is. If the CPU, or corresponding one or more cores of the CPU that are primarily responsible for executing the application remain in the active state longer than a specific time period, the extended residency in the active state may serve as an indication that the application is active, in which case transitioning to a deep C-state may be undesirable. In one set of embodiments, a counter, possibly a saturation counter, may be used to set/determine when an application may be considered idle for the purpose of making a decision about transitioning into deep C-state. In general, a C0-Residency monitor may be used to predict whether transitioning into deep C-state may result in a loss of performance, due to the relatively long time period that may be required to exit the deep C-state.

Figure 5:
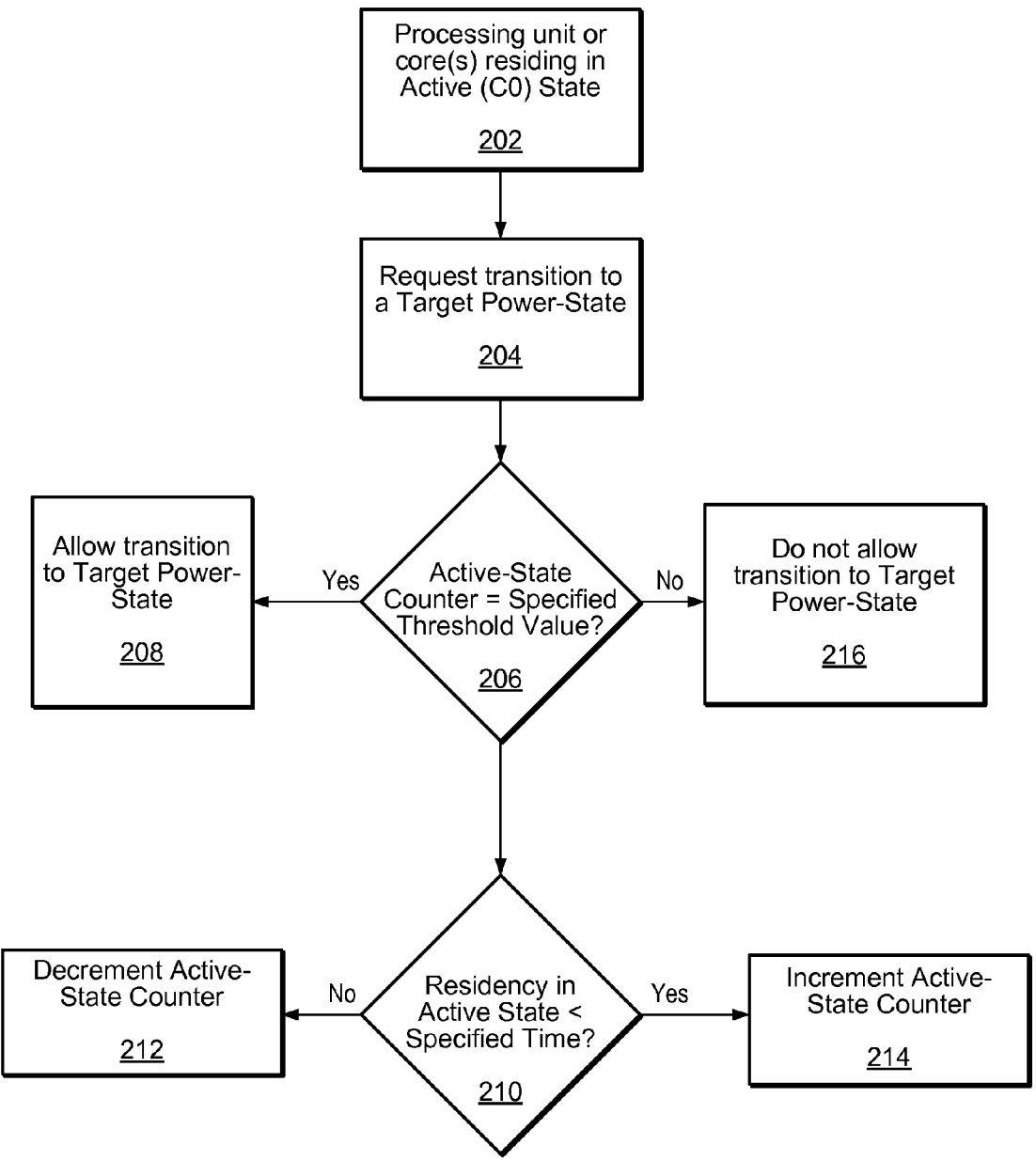
FIG. 5 is a flow diagram of one embodiment of a protocol for monitoring active-state residency of a processing unit.

FIG. 5 shows a flowchart of one embodiment of a C0-Residency, or zero-power residency monitor (monitoring function) that may be used to determine when to transition into deep C-state, or in general into the targeted power-state, without incurring a loss of performance. In one set of embodiments, the zero-power residency monitoring function may be a part of the Controller Predictors determining whether to transition to 0V-state (508) shown in the flowchart of FIG. 3. The processing unit, CPU or corresponding cores of the CPU (e.g. core 702 and/or core 704 in FIG. 2) may be in an active state (202), executing one or more applications. A request for transitioning to a target power-state may be received (204), which may be a request to transition to a zero-power state as determined in (506) in the flow diagram of the embodiment of a protocol for transitioning one or more processor cores to zero-power state shown in FIG. 3. In this case the target power-state would be a zero-power state, or C6-state. The value of an active-state counter may be checked to determine if it is equal to a specific value, which may have been specified in advance (206). When the (value of the) active-state counter is equal to the specified value, the monitoring function may indicate that the target power-state may remain as per the request, e.g. it may remain a deep C-state, such as a C6-state (208). In other words, if transition (in 204) is requested to a target power-state that is, for example, a C6-state, the monitoring function may indicate in (208) that the transition may proceed to the C6-state.

In contrast, when the (value of the) active-state counter is not equal to the specified value (i.e. it is less than the specified value, when the value of the active-state counter is allowed to saturate at the specified value), the monitoring function may indicate that a transition to the target power-state (which, in the example provided, is a C6-state) should not take place (216). The monitoring function may increment and decrement the value of the active-state counter based on how long the processing unit or cores have remained in the active state before a request for a C-state transition is received (204). Thus, the time spent in the active state may be checked (210), and if the residency time was not less than a specified time period (threshold value), the active-state counter may be decremented (212). On the other hand, if the residency time was less than a specified time period, the active-state counter may be incremented (214). In one set of embodiments, in case of (212) the active-state counter may saturate at zero, and in case of (214) it may saturate at the specified value.

Second Monitoring Function

Similar to the embodiment of the Active-State Residency flowchart shown in FIG. 5, a Non-Active-State Residency monitoring function may also be implemented and executed by LMP 716. One embodiment of a Non-Active-State Residency monitoring function is illustrated by way of the flow diagram shown in FIG. 6. The processing unit, CPU or corresponding cores of the CPU (e.g. core 702 and/or core 704 in FIG. 2) may be in an active state (302), executing one or more applications. A request for transitioning to a target power-state may be received (304), which may be a request to transition to a zero-power state as determined in (506) in the flow diagram shown in FIG. 3. In this case the target power-state may again be a zero-power state, or C6-state. The value of a non-active-state counter may be checked to determine if it is less than a first value (or specific value), which may have been specified in advance (306). When the (value of the) non-active-state counter is not less than the specified value (i.e. it is greater than or equal to the specified (first) value, where the value of the non-active-state counter may be allowed to saturate at a second value higher than the first value), the monitoring function may indicate that the target power-state may remain as per the request, e.g. it may remain a deep C-state, such as a C6-state (310) if the target power-state was a deep C-state. In other words, the monitoring function may indicate in (310) that the transition requested to the target power-state (in 304) may proceed as requested.

In contrast, when the (value of the) non-active-state counter is less than the specified value, the monitoring function may indicate that a transition to the target power-state may not take place (308). The monitoring function may increment and decrement the value of the non-active-state counter based on how long the processing unit, CPU, or corresponding cores have remained in the non-active state before a request for a C-state transition is received (304). Thus, the time spent in the non-active state may be checked (314), and if the residency time was less than a specified time period (threshold value), the non-active-state counter may be decremented (312). On the other hand, if the residency time was not less than a specified time period, the non-active-state counter may be incremented (316). In one set of embodiments, in case of (312) the active-state counter may saturate at zero, and in case of (316) it may saturate at the specified first value, or a higher, specified second value. By varying the range between the first value (threshold value) and second value (saturation value), the range of values that correspond to allowed state transitions may also be varied.

Figure 6:
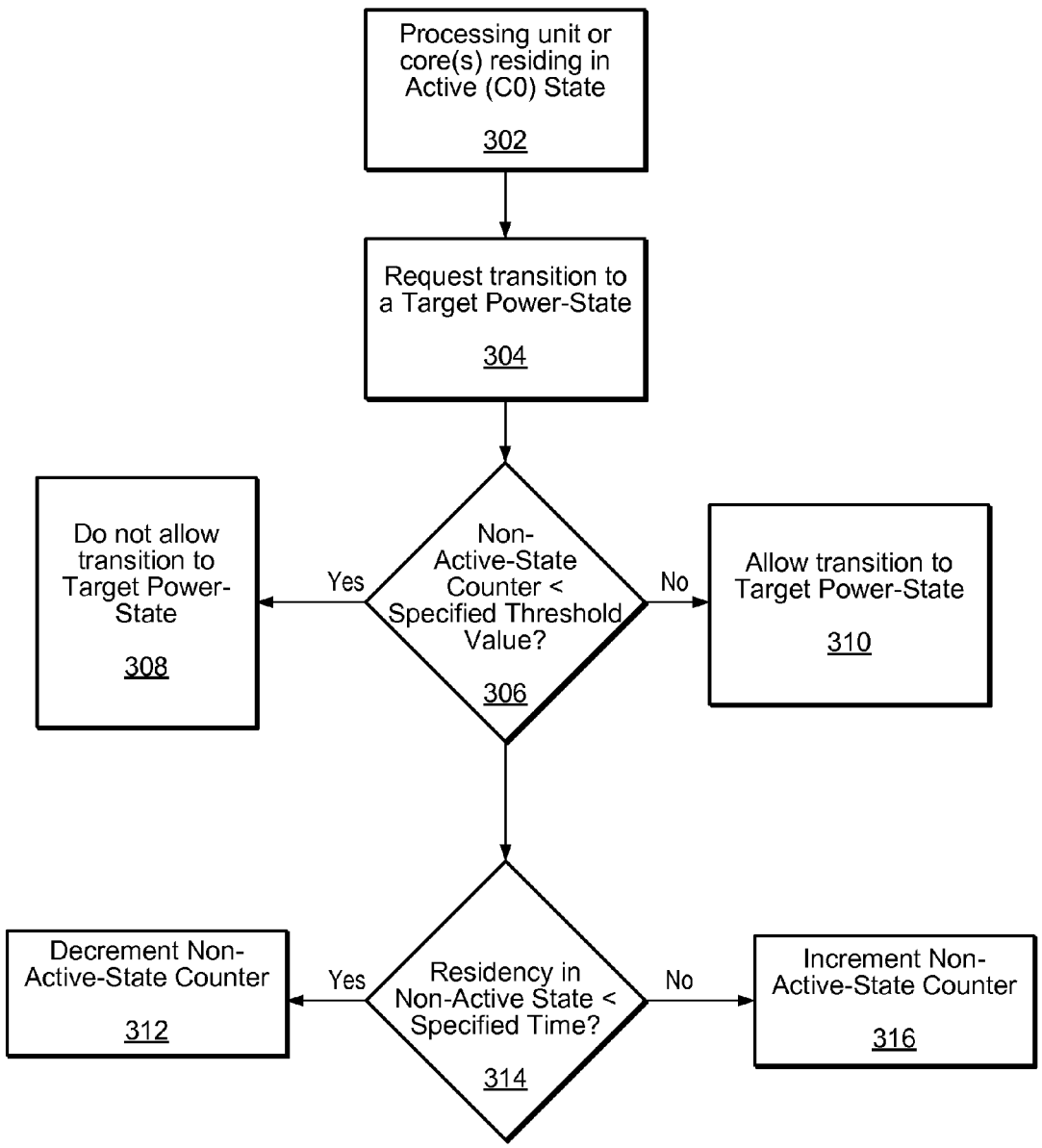
FIG. 6 is a flow diagram of one embodiment of a protocol for monitoring non-active-state residency of a processing unit.

The monitoring function exemplified in the embodiment shown in FIG. 6 may be considered as a means of predicting incoming interrupts when the system is engaged in heavy transfers (e.g. FILE transfers), as increased file transfer activity can be responsible for generating numerous interrupts. A high interrupt rate may be indicative of the processing unit, CPU or corresponding cores remaining in the non-active state for consistently short time periods. The non-active-state counter may or may not be engaged by specifying a higher saturation value than the specified threshold value that may be used for making the decision whether to allow the transition to the requested target power-state. For example, the transition to the requested target power-state may be allowed (based on the non-active-state counter) if the counter is at a specified value of 2 or higher. However, the counter's saturation value may be taken higher than 2 (e.g. 4) to ensure that accidental asynchronous interrupts are filtered out. In other words, two non-active-state saturation counter values (N and M) may be implied, where N is a positive integer and represents a minimal value enabling transition to the requested target power-state, and M is a positive integer greater than or equal to N, and represents the value at which the counter may saturate as it is being incremented.

Third Monitoring Function

A third monitoring function may track changes in a timer tick (TT) interval corresponding to an upper boundary for C-state residency. A TT interrupt may be used by the system (e.g. OS) for periodically waking-up the processing unit/CPU/cores from a low-power state for the purpose of scheduling new tasks. A TT interval may correspond to a time interval that elapses between subsequent TT interrupts (see FIG. 7), and may therefore define an upper limit for low-power state (e.g. zero-volt state) residency for a given OS. For example, the maximum time interval in Microsoft's Vista OS is 15.6 ms. In other words, the OS may automatically wake the processing unit/CPU/cores every 15.6 ms when the processing unit/CPU/cores is in a low-power state. The third monitoring function may be used for immediately capturing changes that the OS may make to the TT interval for specific applications. For example, for multi-media applications the OS may change the TT interval from 15.6 ms to a lower value of 1 ms or 2 ms. Overall, the third monitoring function may operate to determine the length of time the processing unit/CPU/core Core spends in low-power state, to infer the efficiency of the resulting power savings.

When the processing unit/CPU/cores resides in a low-power state (or deep C-state) for only a short time period, the power consumed upon entry and exit to/from the low-power state may substantially negate any potential power savings gained from the processing unit/CPU/cores transitioning and subsequently residing in the low-power state. It may therefore be desirable to cancel the transition to the low-power state in such a case. In one set of embodiments, the controller, e.g. NB Controller 718 in the system of FIG. 2, may track all OS updates of the TT Interval and store the latest TT value. The controller may also track the TT Interrupt itself, and keep track of the actual time left before a next TT interrupt, to determine whether a requested transition to a low-power state should take place.

FIG. 7 shows a timing diagram 400 of one embodiment illustrating the criteria used by the third monitoring function to determine, based on the latest TT interval value stored by the controller (e.g. NB controller 718), whether the requested transition to the target power-state, in this case a low-power state (e.g. C6-state), should be allowed to take place. As shown in FIG. 7, the TT interval may be captured by tracking two subsequent TT interrupts, and may be stored by the controller. The controller may then determine, based on when the request for transitioning to a target power-state is received and when the next TT interval is expected, how long the processing unit/CPU/core would reside in the non-active-state. The "Time to C-state request" in FIG. 7 indicates the time period elapsed between a most recent TT interrupt and when the request for transition to the target power-state is received. If the difference between the TT interval and "Time to C-state request" is greater than a specified power saving threshold (time period) value, then the requested transition to the target power-state, in this case to a low-power state (e.g. C6-state) may be allowed to proceed. Otherwise the requested transition may be prevented, as per the third monitoring function.

Fourth Monitoring Function

In general, the fourth monitoring function may operate as a predictor of impending interrupts (other than the TT interrupts) that may break the deep C-state residency, or residency in a low-power state. For example, if a DMA transfer is in progress, there may be a chance of a corresponding interrupt being issued once the DMA transfer has completed, and such an interrupt may break a low-power state residency. It may therefore be desirable to wait until the DMA transfer has completed to make a decision whether or not to allow a requested transition to deep C-state (low-power state, or a target power-state) to take place. Thus, in one set of embodiments, the interrupts tracked and/or predicted by the fourth monitoring function may correspond to DMA transfers/processes and/or I/O processes. The fourth monitoring function may be configured to track DMA processes to determine whether a corresponding interrupt is expected at the end of the DMA process. In other words, since a DMA transfer may or may not end with a corresponding interrupt, the fourth monitoring function may be configured to track the DMA transfer and wait for a specific time period (a configurable hysteresis period) from the end of the DMA transfer. Once the specific time period expires—indicating that an End-of-DMA Interrupt has not occurred—a requested transition to a Deep C-state may be allowed from the standpoint of this event.

I/O processes may similarly be monitored to predict impending interrupts based on permission received from the I/O domain. In many systems, a hub comprising and/or interfacing with most I/O devices—such as a South Bridge (SB), for example—may be better suited than any other system component to indicate whether or not an interrupt is expected based on I/O activity. For example, an SB may be tracking the operation of USB (Universal Serial Bus) or GBE (Gigabit Ethernet) devices, and may (broadly) be overseeing the I/O domain in general. Therefore, in one set of embodiments, a protocol may be implemented to receive information from the SB to indicate whether or not a requested transition to a target power-state (e.g. low-power state) should be allowed to occur, from the standpoint of certain I/O devices. When no interrupts are expected based on I/O activity, requested transitions to specific target states, e.g. low-power states, may be allowed to occur from the standpoint of the monitored I/O devices.

For example, in a system such as system 200 in FIG. 2, controller 718 may determine that a transition to a target power-state, which may be a low-power state, has been requested. SB 720 may track its internal structures to determine whether to indicate to controller 718 that a requested transition to the low-power state should be allowed or denied. In one set of embodiments, SB 720 may transmit a packet to controller 718, with an indication of "go" (requested transition allowed) or "no go" (requested transition denied). In case of a "no go" indication from SB 720, the processing unit/processor/affected cores may remain in a non-active state, awaiting a pending change of status received from SB 720. For example, should one or more devices get unplugged from the system, SB 720 may subsequently transmit a "go" packet to indicate that the requested transition is cleared. Similarly, SB 720 may also indicate that the requested transition is cleared some time period following the request and the initial indication, even if no devices are unplugged. It may also be conceivable that following a transition to a low-power state, SB 720 may transmit a "no go" packet due to new I/O events/configuration.

As illustrated in diagram 420 in FIG. 8, the fourth monitoring function may indicate that a requested transition to the target power-state, e.g. deep C-state such as C6-state, may take place if no interrupt is received within the specified time period designated as "No end-of-DMA Interrupt Window". A subsequent interrupt may then wake up the processing unit/CPU/cores and cause an exit from the deep C-state. Similarly, as shown in diagram 422 of FIG. 8, while in a non-active state, the controller (e.g. NB Controller 718) may send a request [packet] to I/O (e.g. SB) indicating that a transition to a low-power state has been requested. The SB may respond with either a "go" or "no go" condition [packet], indicating whether to allow the requested transition to the low power-state to take place. In case a "no go" response is received by the controller, the SB may subsequently transmit a go condition, once a specified time period has elapsed without an interrupt. Once in the deep C-state, an interrupt may wake up the processing unit/CPU/cores and cause an exit from the deep C-state, similarly to the conditions shown in diagram 420.

Configuring and Combining the Monitoring Functions

Each of the four monitoring functions may be enabled individually, and the monitoring functions may be configured to operate in concert with each other. In one set of embodiments, a preferred scheme for applying any one or more of the different monitoring functions may be based on system particulars, and which features are present and/or enabled within a given system. For example, by default, the first and second monitoring functions may be enabled in all systems, the third monitoring function may be enabled in systems featuring heavy multi-media traffic, and the fourth monitoring function may be disabled when the I/O configuration is configured predominantly for USB, and/or when end-of-DMA interrupts are not expected in given I/O configurations. Various other combinations are possible, and use of any one or more of the monitoring functions may be determined based on specific system and performance needs. Overall, the first and second monitoring functions may be used for ensuring system performance is not degraded as a result of a processing unit/CPU/ cores transitioning into a low-power state, while the third and fourth monitoring functions may be used to ensure that entry into a low-power state provides optimum or maximum power savings.

Transitioning one or more of cores 702 and 704 to a zero-power state (C6-state) in system 200 will now be described according to FIG. 3, which shows a flow diagram of one embodiment of a protocol for transitioning one or more processor cores to C6-state. An operating system (OS) or high-level software program running on a processor, e.g. processor 202 of FIG. 2, may issue a command comprising a request for one or more cores, e.g. cores 702 and/or 704 of FIG. 2, to transition to a C-state, e.g. C-state x (Cx-state), where x may be a number designating a specific power state (502). The command may be recognizable by microcode executing on the processor core or processor cores, and the microcode may trap the command, and request a controller configured on the processor, e.g. NB controller 718 of FIG. 2, to transition to the given C-state (504). The microcode may then spin, awaiting a subsequent request from the controller (504).

The controller may subsequently determine to which hardware related C-state to transition. In one embodiment, the controller may convert the Cx-state request to a hardware C-state, using BIOS (or driver) configuration, for example, which may result in an indication for a transition to a zero-power (C6) state (506). The controller may determine based on certain predictors whether to transition to the requested C6-state, or to a demoted, lower C-state, i.e. a non-zero-power state (508). If the controller determines that transition to C6-state should not proceed (510), the controller may demote C6-state to a lower C-state (520). If the controller determines that transition to C6-state should proceed (510), the controller may update a register (which may be a power action register comprised within the controller) to specify in the register that a transition to C6-state is to take place, by updating the register to indicate the proper actions to be taken to facilitate and effect transition to C6-state (512). For example, the controller may update the register to indicate the next required action to be a FLUSH core to reach C6-state. After updating the register, the controller may assert an interrupt signal to indicate to the microcode that the microcode may proceed (512). In one set of embodiments, the controller may assert a STPCLK signal, which, according to prior art, is an ACPI defined Southbridge originated request for a processor or processor core to halt execution. As shown in 512, in system 200, for example, the STPCLK signal may be asserted by PMC 714 comprised in NBC 718.

The executing microcode may read the contents of the power action register, and upon recognizing the required operations that need to be performed, perform those operations, such as the FLUSH core operation, which may include flushing the processor core data (e.g. architecture and system state, cache data, etc.) into external system memory or on-die storage (514). Once the required operations (such as FLUSH core) have been performed, the microcode may update a second register (which may be a power acknowledge register configured within the controller) to indicate that the operations have been performed (514). For example, a "Done" bit may be set within the power acknowledge register. The controller may check the power acknowledge register, and upon recognizing that the required operations have been performed, may issue respective requests to gate off the operating clock of the transitioning core, and lower the transitioning core's supply voltage to the specified zero-power state level, which may be specified as 0V in some embodiments (516). Once the supply voltage has been lowered and the operating clock of the core has been uncoupled from the core, the core will reside in C6-state (518).

Figure 3:
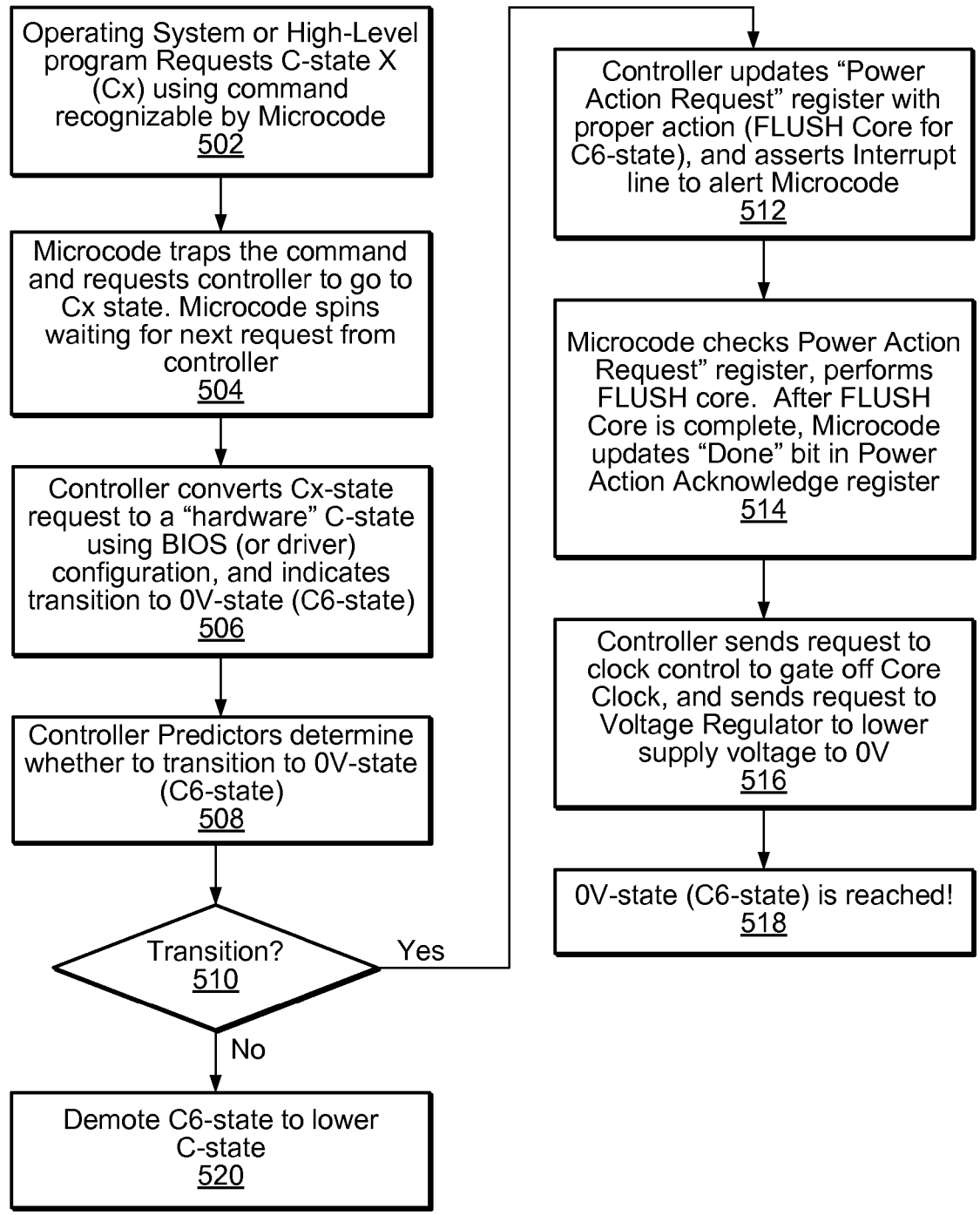
FIG. 3 is a flow diagram of one embodiment of a protocol for transitioning one or more processor cores to C6-state.
Figure 4:
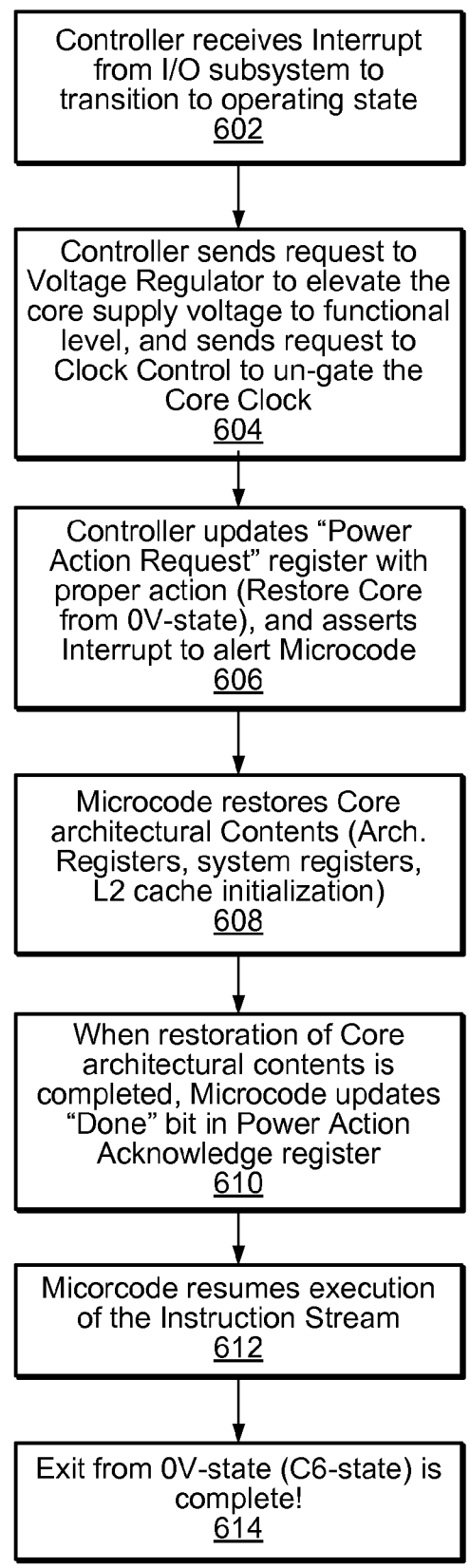
FIG. 4 is a flow diagram of one embodiment of a protocol for transitioning one or more processor cores to an operating state from C6-state.

FIG. 4 is a flow diagram of one embodiment of a protocol for transitioning one or more processor cores to an operating state from a zero-power state, e.g. from C6-state to C0-state. Similarly to the embodiment of the protocol illustrated by the flow diagram shown in FIG. 3, the protocol for transitioning from C6-state to C0-state may also apply, by way of example, to system 200 shown in FIG. 2. While the processor core (or cores) comprised in the processor is (are) in C6-state, the controller (which may be configured on the processor) may receive an interrupt signal, from an I/O subsystem, for example, to transition the processor core to an operating (e.g. C0) state (602). It should be noted that in some embodiments the interrupt signal may be received by a programmable interrupt controller (PIC) configured to handle the interrupt signal, and the PIC may be configured either inside the controller or outside the controller on the processor. Those skilled in the art will recognize that a variety of solutions for handling the interrupt signal on the processor are possible, and many of those solutions may be implemented to fit the protocol described herein. In response to the request, the controller (again, the controller may be a NB controller) may initiate re-activating the core, or cores, that were requested to transition back into an operating state. Accordingly, the controller may send out a request to a voltage regulator responsible for regulating the supply voltage of the core, to elevate the core supply voltage to a functional level (604). The controller may also send a request to a clock-control circuit responsible for providing an operating clock to the core, to un-gate, i.e. to re-couple the operating clock to the core (604). The controller may then update the power action request register to indicate what operations are to be performed for bringing the core back to an operational state, and may subsequently assert an interrupt signal to activate the microcode executable by the core (606). In one set of embodiments, the interrupt signal may be a STARTCLK signal, which may operate to activate a non-volatile storage element configured on the core to store at least an essential portion of the microcode needed by the core to start and continue executing the code.

The executing microcode may check the contents of the power action request register, and begin initializing the core by restoring the architectural and system contents, which may at this time be read back into the appropriate locations within the core from the storage media (external, system memory or on-die memory) where they had been stored as part of the transition into C6-state (608). This may also include initializing the processor cache system (e.g. L1, L2, L3 . . . ), and reading back (e.g. into patch RAM) any portion of the microcode that may have originally resided (e.g. in the patch RAM) outside the non-volatile storage element holding the essential portion of the microcode (608). Once the restoration of the architectural contents of the core has been completed, the microcode may update the power action acknowledge register to indicate that the core is now operational. For example, the microcode may set a "Done" bit inside power action acknowledge register (610). The microcode may then resume execution of the instruction stream on the core (612). Once execution of the instruction stream resumes, the core has completely exited C6-state into an operating (C0) state (614).

It should be noted that while FIG. 2 illustrates a single processor with two cores, the protocol—illustrated by respective embodiments in FIG. 3 and FIG. 4 for entering and exiting C6-state, respectively—may be equally applied to transition a single core or multiple cores (and more than two cores) to and from C6-state, and while some cores reside in C6-state, other cores may simultaneously remain fully functional. In addition, not each core is required to run the exact same microcode, and the controller may be configured to interact with the various different microcodes executed by the various cores. Those skilled in the art will appreciate the various different combinations and configurations in which the protocol may be applied to conduct transition to C6-state fully under the control of the controller (e.g. NB controller) that may be configured on the processor. Referencing FIG. 2, the power action request and power action acknowledge registers may be comprised in NB controller 718, in some embodiments specifically within PMC 714, or may reside in any portion of the processor, including the core, so long that they always remains powered on. In general, the various different combinations and configurations in which the protocol may be used to conduct transitioning in and out of a low-power state and/or zero-power state, e.g. C6-state, may be implemented under the control of a circuit (or "first circuit") configured on the processor to perform one or more functions in support of the one or more cores also configured on the processor. While the discussed embodiments focus on an NB controller, those skilled in the art will appreciate that alternate embodiments with a different circuit, control circuit, distributed circuit (as previously discussed) or controller (or multiple circuits) configured on the processor to execute the protocol are possible and are contemplated, and that all possible embodiments are not limited to those explicitly shown herein.

BENEFITS AND ADVANTAGES

As previously mentioned, transitioning to C6-state provides many benefits over other low-power states (other C-state). One benefit is the improved power savings and battery life increase in mobile and server domains, due to the lowering of the static power component to 0 W. In the mobile domain, this may prove relevant for both thin & light and ultra-portable. C6-state also enables aggressive performance improvements in processor process technology and transistor geometry, which may otherwise have to be traded-off versus static power consumption. Accordingly, various embodiments of the protocol as detailed within the following claims may provide a flexible mechanism which may be controlled by the OS and/or HW, for placing one or several cores of a processor (e.g. CPU) in a power down state, or zero-power state, while keeping all other system parts, including other processor cores, chipset, I/O, and DRAM in a fully operational state. This provides a key benefit over system sleep states (e.g. S3-S5) in which all system components are powered down and execution is completely halted.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

We claim:

1. A method for transitioning a processing unit to a target power-state, the method comprising:
    monitoring one or more of:
        active-state residency of the processing unit;
        non-active-state residency of the processing unit;
        Direct Memory Access (DMA) transfer activity associated with the processing unit;
        Input/Output (I/O) processes associated with the processing unit; or
        a value of a timer-tick (TT) interval associated with the processing unit;
    deriving status information from said monitoring; and
    determining based on the status information whether to allow the processing unit to transition to the target power-state.

2. The method of claim 1, further comprising:
    receiving a request for transitioning the processing unit to the target power-state;
    wherein said determining whether to allow the processing unit to transition to the target power-state comprises:
        granting the request in response to the status information indicating that the processing unit should be allowed to transition to the target power-state; and
        denying the request in response to the status information indicating that the processing unit should not be allowed to transition to the target power-state.

3. The method of claim 1, wherein the status information comprises one or more of:
    a first value indicative of how frequently the processing unit resides in an active-state for less than a first time interval;
    a second value indicative of how frequently the processing unit resides in a non-active-state for more than or equal to a second time interval;
    a third value indicative of expected interrupts corresponding to the DMA transfer activity;
    a fourth value indicative of expected interrupts corresponding to the I/O processes; or
    a fifth value indicative of a time interval remaining before a next TT interrupt.

4. The method of claim 1;
    wherein said monitoring the active-state residency of the processing unit comprises incrementing a count value each time the processing unit remains in an active-state for less than a specific time interval, and decrementing the count value each time the processing unit does not remain in the active-state for less than the specific time interval;
    wherein said deriving status information from said monitoring comprises checking the count value; and
    wherein said determining comprises indicating that the processing unit is allowed to transition to the target power-state when the count value equals a specific value.

5. The method of claim 4;
    wherein said incrementing the count value comprises no longer incrementing the count value once the count value reaches the specific value; and/or
    wherein said decrementing the count value comprises no longer decrementing the count value once the count value reaches a specified minimum.

6. The method of claim 4, wherein said monitoring the active-state residency of the processing unit further comprises setting a default value of the count value to zero.

7. The method of claim 1;
wherein said monitoring the non-active-state residency of the processing unit comprises incrementing a count value each time the processing unit remains in a non-active-state for longer than or equal to a specific time interval, and decrementing the count value each time the processing unit does not remain in the non-active-state for longer than or equal to the specific time interval;
wherein said deriving status information from said monitoring comprises checking the count value; and
wherein said determining comprises indicating that the processing unit is allowed to transition to the target power-state when the count value is greater than or equal to a first value.

8. The method of claim 7;
wherein said incrementing the count value comprises no longer incrementing the count value once the count value reaches one of:
the first value; or
a second value greater than the first value; and
wherein said decrementing the count value comprises no longer decrementing the count value once the count value reaches a specified minimum.

9. The method of claim 7, wherein said monitoring the non-active-state residency of the processing unit further comprises setting a default value of the count value to zero.

10. The method of claim 1, wherein said monitoring the Direct Memory Access (DMA) transfer activity associated with the processing unit comprises waiting for an end-of-DMA interrupt for a specific time period from the end of a monitored DMA transfer.

11. The method of claim 10, wherein said deriving status information from said monitoring comprises determining whether the end-of-DMA interrupt occurs during the specific time period.

12. The method of claim 11, wherein said determining whether to allow the processing unit to transition to the target power-state comprises indicating that the processing unit is allowed to transition to the target power-state once the specific time period expires, in response to said determining whether an end-of-DMA interrupt occurs during the specific time period indicating that no end-of-DMA interrupt has occurred during the specific time period.

13. The method of claim 1, wherein said monitoring the Input/Output (I/O) processes associated with the processing unit comprises receiving I/O information from a hub comprising and/or interfacing with a plurality of I/O devices.

14. The method of claim 13, wherein said deriving status information from said monitoring comprises determining whether or not the I/O information is indicative of one or more interrupts expected based on I/O activity.

15. The method of claim 14, wherein said determining whether to allow the processing unit to transition to the target power-state comprises indicating that the processing unit is allowed to transition to the target power-state, in response to said determining whether or not the I/O information is indicative of one or more interrupts expected based on I/O activity indicating that no interrupts based on I/O activity are expected.

16. The method of claim 1, wherein said monitoring the value of a timer-tick (TT) interval associated with the processing unit comprises performing one or more of:
tracking subsequent TT interrupts and determining a time elapsed between the subsequent TT interrupts to obtain a current value of the TT interval; or
tracking operating system updates of the TT interval and storing a latest value of the TT interval.

17. The method of claim 16, wherein said deriving status information from said monitoring comprises determining the length of a first time period, wherein the length of the first time period is indicative of how long the processing unit would reside in the target power-state until a next TT interrupt occurred.

18. The method of claim 17, wherein said determining the length of the first time period comprises:
determining the length of a second time period, wherein the length of the second time period is indicative of time elapsed between a most recently occurred previous TT interrupt and receipt of a request for the processing unit to transition to the target power-state; and
obtaining an expected time period by subtracting the length of the second time period from one of:
the current value of the TT interval; or
the latest value of the TT interval.

19. The method of claim 18, wherein said determining whether to allow the processing unit to transition to the target power-state comprises indicating that the processing unit is allowed to transition to the target power-state when the expected time period is greater than a specified power saving threshold time period.

20. The method of claim 1, wherein the processing unit is one of:
one or more processor cores comprised in a multi-core processor;
one or more embedded microcontrollers;
one or more embedded processors; and
one or more digital signal processors.

21. The method of claim 1, wherein the target power-state is one of:
a low-power state;
a zero-volt state; and
a non-active state.

22. A processor comprising:
a processing core; and
a controller interfacing with the processing core, wherein the controller is configured to:
monitor one or more of:
active-state residency of the processing core;
non-active-state residency of the processing core;
Direct Memory Access (DMA) transfer activity associated with the processing core;
Input/Output (I/O) processes associated with the processing core; or
a value of a timer-tick (TT) interval associated with the processing core;
derive status information from the monitoring; and
determine based on the status information whether to allow the processing core to transition to a target power-state.

23. The processor of claim 22, wherein the controller is further configured to:
receive a request to transition the processing core to the target power-state;
grant the request in response to the status information indicating that the processing core should be allowed to transition to the target power-state; and
deny the request in response the status information indicating that the processing core should not be allowed to transition to the target power-state.

24. The processor of claim 22, further comprising:
one or more additional processing cores;
wherein the controller is further configured to:
monitor one or more of:
respective active-state residencies of one or more of the one or more additional processing cores;
respective non-active-state residencies of one or more of the one or more additional processing cores;
respective Direct Memory Access (DMA) transfer activities associated with one or more of the one or more additional processing cores;
respective Input/Output (I/O) processes associated with one or more of the one or more additional processing cores; or
respective values of timer-tick (TT) intervals associated with one or more of the one or more additional processing cores;
for each respective core of one or more of the one or more additional processing cores for which the monitoring is performed:
derive respective status information based on the monitoring; and
determine based on the respective status information whether the respective core should be allowed to transition to a corresponding target power-state.

25. The processor of claim 24, wherein the controller is further configured to:
receive a respective request for the respective core to transition to the corresponding target power-state;
grant the respective request when the respective status information indicates that the respective core should be allowed to transition to the corresponding target power-state; and
deny the respective request when the respective status information indicates that the respective core should not be allowed to transition to the corresponding target power-state.

26. The processor of claim 22, wherein the target power-state is one of:
a low-power state;
a zero-volt state; or
a non-active state.

27. A system comprising:
one or more processing units; and
a control unit configured to:
monitor one or more of:
respective active-state residencies of one or more of the processing units;
respective non-active-state residencies of one or more of the processing units;
respective Direct Memory Access (DMA) transfer activities associated with one or more of the processing units;
respective Input/Output (I/O) processes associated with one or more of the processing units; or
respective values of timer-tick (TT) intervals associated with one or more of the processing units;
for each respective processing unit of one or more of the processing units for which the monitoring is performed:
derive respective status information based on the monitoring; and
determine based on the respective status information whether the respective processing unit should be allowed to transition to a corresponding target power-state.

28. The system of claim 27, wherein the control unit is further configured to:
receive a respective request for the respective processing unit to transition to the corresponding target power-state;
grant the respective request when the respective status information indicates that the respective processing unit should be allowed to transition to the corresponding target power-state; and
deny the respective request when the respective status information indicates that the respective processing unit should not be allowed to transition to the corresponding target power-state.

29. A processor comprising:
one or more processor cores, each respective processor core of the one or more processor cores comprising:
one or more state registers; and
non-volatile memory configured to store microcode instructions executed by the respective processor core;
a power management controller interfacing with the non-volatile memory of each respective processor core of the one or more processor cores; and
a state monitor interfacing with the power management controller;
wherein the power management controller is configured to communicate with the non-volatile memory of each respective processor core of the one or more processor cores to recognize when a respective request is made to transition the respective processor core to a corresponding target power-state;
wherein the state monitor is configured to:
monitor one or more of:
respective active-state residency of the respective processing core;
respective non-active-state residency of the respective processing core;
respective Direct Memory Access (DMA) transfer activity associated with the respective processing core;
respective Input/Output (I/O) processes associated with the respective processing core; or
respective value of a timer-tick (TT) interval associated with the respective processing core;
derive respective status information for the respective processing core based on the monitoring; and
set a respective flag for the respective processing core based on the respective status information, wherein the respective flag is indicative of whether the respective processing core should be allowed to transition to the corresponding target power-state;
wherein the power management controller is further configured to transition the respective processor core to the corresponding target power-state based at least on the respective flag.

30. The processor of claim 29, wherein the target power-state is one of:
a low-power state;
a zero-volt state; or
a non-active state.

31. The processor of claim 29 comprised in a system, wherein the system further comprises a hub that includes and/or interfaces with a plurality of I/O devices operated to perform the I/O processes;
wherein the hub is configured to indicate to the state monitor whether or not an interrupt is expected based on I/O activity.

32. The system of claim 31, wherein the hub is a South-Bridge.

33. The processor of claim 29 comprised in a system, wherein the system further comprises one or more DMA modules operated to perform the DMA transfer activity, wherein the DMA transfer activity comprises transfers to and/or from system memory performed by the DMA modules.

* * * * *